(12) United States Patent
Niu

(10) Patent No.: US 12,493,199 B2
(45) Date of Patent: Dec. 9, 2025

(54) SPLICING DISPLAY APPARATUS FOR FLOATING IMAGE AND MULTI-LAYER DISPLAY DEVICE COMPRISING THE SAME

(71) Applicant: SHANGHAI YUPEI PHOTOELECTRIC TECHNOLOGY LIMITED, Shanghai (CN)

(72) Inventor: Lei Niu, Shanghai (CN)

(73) Assignee: SHANGHAI YUPEI PHOTOELECTRIC TECHNOLOGY LIMITED, Shanghai (CN)

( * ) Notice: Subject to any disclaimer, the term of this patent is extended or adjusted under 35 U.S.C. 154(b) by 74 days.

(21) Appl. No.: 18/629,605

(22) Filed: Apr. 8, 2024

(65) Prior Publication Data

US 2024/0255775 A1 Aug. 1, 2024

Related U.S. Application Data

(63) Continuation of application No. PCT/CN2022/123759, filed on Oct. 8, 2022.

(30) Foreign Application Priority Data

Oct. 8, 2021 (CN) .......................... 202111172371.4

(51) Int. Cl.
*G02B 30/56* (2020.01)
*G02B 27/09* (2006.01)
*G02B 30/27* (2020.01)

(52) U.S. Cl.
CPC ......... *G02B 30/56* (2020.01); *G02B 27/0977* (2013.01); *G02B 30/27* (2020.01)

(58) Field of Classification Search
CPC .... G02B 30/56; G02B 27/0977; G02B 30/27; G02B 3/08; G02B 27/28; G02B 27/52
See application file for complete search history.

(56) References Cited

U.S. PATENT DOCUMENTS

| 5,712,732 A | 1/1998 | Street |
| 2003/0053033 A1 | 3/2003 | Vrachan et al. |

(Continued)

FOREIGN PATENT DOCUMENTS

| CN | 102591124 A | 7/2012 |
| CN | 108269511 A | 7/2018 |

(Continued)

OTHER PUBLICATIONS

International Search Report issued for International Patent Application No. PCT/CN2022/123759, Date of mailing: Dec. 15, 2022, 6 pages including English translation.

(Continued)

*Primary Examiner* — Fernando Alcon
(74) *Attorney, Agent, or Firm* — HSML P.C.

(57) ABSTRACT

A splicing display apparatus for floating image and a multi-layer display device comprising the same are disclosed. The splicing display apparatus comprises: a display module configured to emit, on a display plane thereof, display light constituting a target image; a plurality of optical imaging modules configured to receive the display light to form a floating image in the air; and a one-dimensional scattering screen to scatter light in the y-direction, wherein each of the plurality of optical imaging modules comprises: a first one-dimensional conjugate imaging element to converge light beams from points on the display plane onto the one-dimensional scattering screen in the y-direction; and a second one-dimensional conjugate imaging element to converge light beams from points on the display plane onto a floating image plane different from the plane where the one-dimensional scattering screen is located in the x-direction. The x-direction and the y-direction are orthogonal to a main optical axis of the optical imaging module respectively.

20 Claims, 17 Drawing Sheets

(56) References Cited

U.S. PATENT DOCUMENTS

| | | | |
|---|---|---|---|
| 2017/0227928 A1* | 8/2017 | Suginohara | G03H 1/2202 |
| 2017/0261729 A1 | 9/2017 | Powell | |
| 2018/0259810 A1 | 9/2018 | Numata et al. | |
| 2020/0026091 A1* | 1/2020 | Nykerk | F21S 43/26 |
| 2022/0365363 A1* | 11/2022 | Wang | H04N 13/128 |
| 2022/0365364 A1* | 11/2022 | Niu | G02B 17/08 |
| 2022/0413317 A1* | 12/2022 | Daiku | G02B 5/122 |
| 2023/0341703 A1* | 10/2023 | Niu | G02B 27/283 |
| 2024/0142797 A1* | 5/2024 | Niu | G06F 3/1446 |
| 2024/0192498 A1* | 6/2024 | Kessler | G02B 27/283 |
| 2024/0361611 A1* | 10/2024 | Daiku | G02B 30/56 |

FOREIGN PATENT DOCUMENTS

| | | | | |
|---|---|---|---|---|
| CN | 113156663 A | | 7/2021 | |
| CN | 113419354 A | | 9/2021 | |
| EP | 4071526 A1 * | | 10/2022 | G02B 30/56 |
| JP | 2003156712 A | | 5/2003 | |
| JP | 2011203731 A | | 10/2011 | |
| JP | 2017010014 A | | 1/2017 | |
| WO | 2020014038 A2 | | 1/2020 | |
| WO | WO-2023276921 A1 * | | 1/2023 | G02B 30/56 |

OTHER PUBLICATIONS

Office Action issued for Japanese Patent Application No. 2024-521182, Dispatch date: Mar. 25, 2025, 10 pages including English machine translation.

Kurogi, T. et al., "Scalable Autostereoscopic Display for Interaction with Floating Images," Proceedings of the 2018 ACM International Conference on Interactive Surfaces and Spaces, ACM, New York, NY, USA, Nov. 19, 2018, pp. 453-456.

Extended European Search Report issued for European Patent Application No. 22877937.7, dated Sep. 10, 2025, 9 pages.

Request for the Submission of an Opinion issued for Korean Patent Application No. 10-2024-7015337, Dispatched date: Aug. 26, 2025, 18 pages including English machine translation.

* cited by examiner light ray reflected twice light rays reflected once light rays reflected once floating image plane of the display apparatus

SPLICING DISPLAY APPARATUS FOR FLOATING IMAGE AND MULTI-LAYER DISPLAY DEVICE COMPRISING THE SAME

TECHNICAL FIELD

Embodiments described herein generally relate to optical field three-dimensional display technology, and more particularly to a splicing display apparatus for floating image and a multi-layer display device comprising the splicing display apparatus.

BACKGROUND

Among the numerous display technologies, in-air floating display technology has attracted the attention of many researchers, because it can present images in the air and bring to the viewer a strong visual impact and a sensory experience that appears both real and imaginary.

There are three main types of existing floating display technology. The first type is traditional optical lens imaging, for example, a structure comprising a concave reflecting mirror plus a beam splitter, which is the earliest proposed scheme of such type of display system. The illuminated real object or the content displayed by LCD is reflected by the beam splitter into the concave reflecting mirror, and the light rays pass through the beam splitter again after the convergence of the concave reflecting mirror, and then are imaged on the other side of the beam splitter. At this time, the observer can see the image floating in the air. For such technical solution, the imaging size of the floating image is small, and the aberration such as distortion is serious. The second type is to use the principle of integrated imaging. This type of scheme is composed of an array of micro-lens and several arrays of image units. The light rays emitted from the points displaying the same image information in the image unit converge in space through the corresponding micro-lenses to form floating image points. The advantage of such type of scheme is that the thickness of the display device is extremely small, which is substantially the thickness of the display. The disadvantage is that the resolution is very low and the cost is high.

The third type is to use the "negative refractive index screen" composed of special microstructure for floating imaging, mainly including the following kinds: a. Retroreflective Structure plus Beam Splitter: this structure is mainly composed of glass beads or arrays of micro-prism. Such structure can realize the effect that the reflected light and the incident light are parallel to each other in opposite directions. The light rays emitted by the display source are incident to the retroreflective structure through the beam splitter, and the reflected light passing through the retroreflective structure will pass through the beam splitter again in the opposite direction of the incident light and converge on the other side of the beam splitter for imaging. b. Two-layer Flat Mirror Arrays: this scheme is composed of upper and lower layers of flat mirror arrays and the flat mirror units between the two layers are perpendicular to each other. The light rays emitted by the display source are reflected by the plane mirror array and then converges on the other side for imaging. c. Micro-Boss Structure Array: this scheme is composed of arrays of micro-boss structures. The light rays emitted by the display source are reflected twice by the micro-boss structures and converges on the other side for imaging. The advantage of such type of technical solution is that there is no aberration. The disadvantages are the existence of ghost images, the high processing cost on "negative refractive index screen" and the large system volume.

For different scene requirements, the required sizes of floating images are different. In prior art, although there are the above-mentioned various floating display technologies, the size of the floating image displayed by the floating display apparatus is generally defined at the designing stage of the manufacturer and cannot be adjusted during use.

Thus, when a user wishes to present floating images of different sizes according to different application scenes, it is generally necessary to purchase floating display apparatuses of different sizes. For the manufacturer of floating display apparatus, it is necessary to design different floating display apparatuses according to different users' needs (especially design different optical systems to adapt to image display units of different sizes) and adapt them one by one, which consumes a lot of manpower and material resources.

SUMMARY

Exemplary embodiments of the present invention aim to overcome the above-mentioned and/or other problems in the prior art, in particular to provide a splicing display apparatus for floating image that is capable of achieving seamless splicing of floating image in various sizes with a single modular design, while enabling lower manufacturing costs and a more compact optical layout.

Specifically, an exemplary embodiment of the present invention provides a splicing display apparatus for floating image which includes: a display module configured to emit, on a display plane thereof, display light constituting a target image; a plurality of optical imaging modules configured to receive the display light to form a floating image in the air; and a one-dimensional scattering screen to scatter light in the y-direction, wherein each of the plurality of optical imaging modules includes: a first one-dimensional conjugate imaging element to converge light beams from points on the display plane onto the one-dimensional scattering screen in the y-direction; and a second one-dimensional conjugate imaging element to converge the light beams from points on the display plane onto a floating image plane different from the plane where the one-dimensional scattering screen is located in the x-direction. The x-direction and the y-direction are orthogonal to a main optical axis of the optical imaging module respectively.

In the splicing display apparatus of the above exemplary embodiment, floating images may be formed in the air by a display module and a plurality of imaging modules, and at the same time, a larger range of visual angles is formed in the second direction with a scattering screen, thereby enabling a large-size floating display. Such splicing display apparatus apparently reduces the cost for implementing floating display of different sizes, since there is no need to design different optical imaging systems for floating images of specific sizes, only needing to select a display module, a proper number of imaging modules and a scattering screen according to the required size of the floating image, and an optical element of small size is easier to process than an optical element of large size. In addition, such splicing display apparatus has significantly reduced thickness and is more compact compared with the larger-sized floating display apparatus in the prior art.

According to another exemplary embodiment of the present invention, a multi-layer display device is also provided. The multi-layer display device comprises a splicing display apparatus of the above exemplary embodiment and a transparent display apparatus being positioned optically downstream of the floating display apparatus. A display plane of the transparent display apparatus is located at a position different from a position of the floating image plane.

Other characteristics and aspects will become clear through the following detailed description, drawings and claims.

BRIEF DESCRIPTION OF DRAWINGS

The invention may be better understood by describing exemplary embodiments of the invention in conjunction with the accompanying drawings, in which.

DETAILED DESCRIPTION

Figure 1:
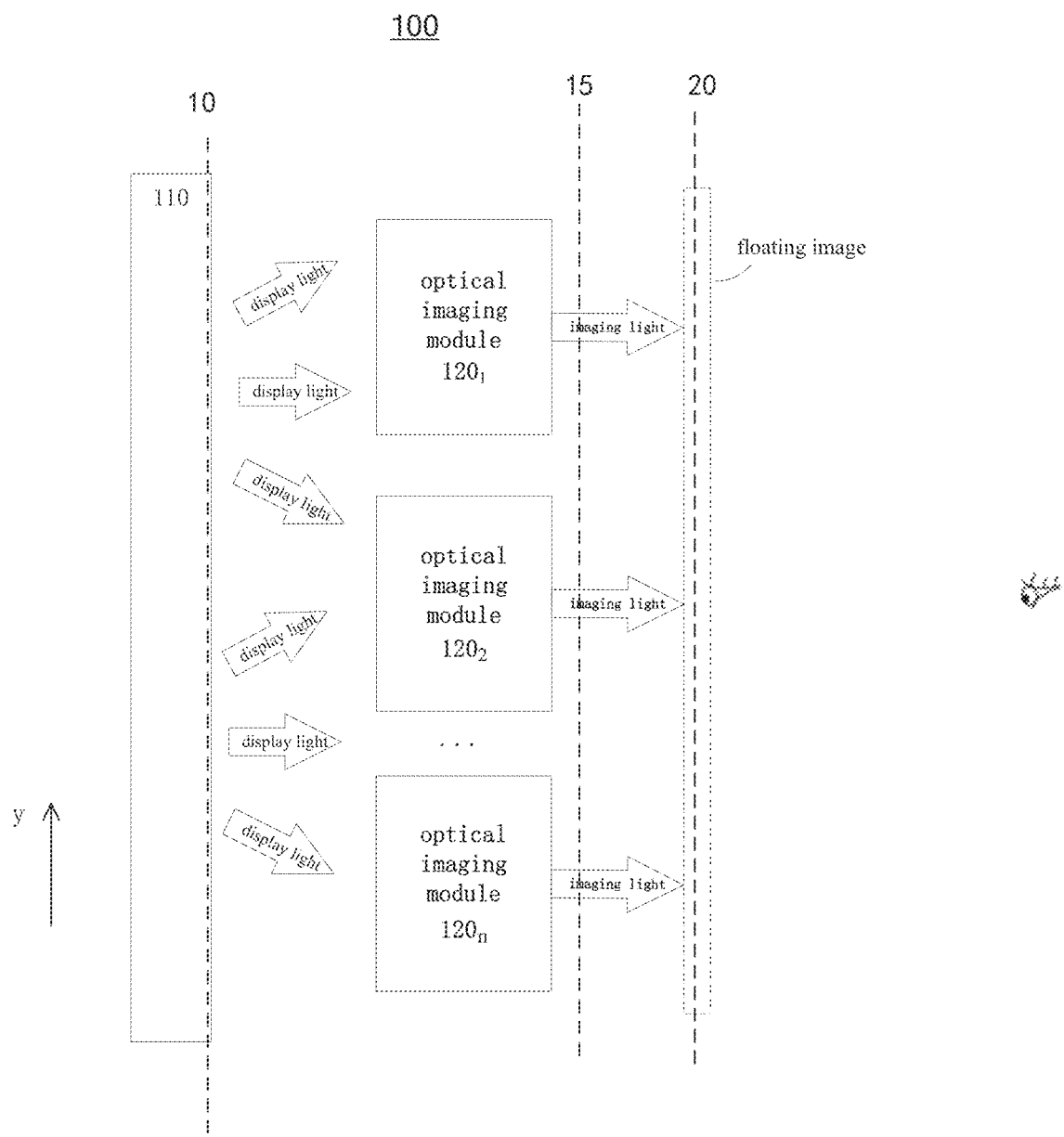
FIG. 1 illustrates a schematic block diagram of a splicing display apparatus for floating image according to an embodiment of the present invention.

A detailed description of the present invention will be described below, and it should be noted that, in the detailed description of these embodiments, all features of the actual embodiments may not be described in detail in this description for the sake of brevity and conciseness of the description. It should be understood that, in the actual implementation of any one of the embodiments, just as in the process of any engineering project or design project, in order to achieve the developers' specific goals and in order to meet system-related or business-related restrictions, a variety of concrete decisions are often made, and this varies from one implementation to another. In addition, it should also be understood that, although the effort made in such developing process may be complex and time-consuming, some variations such as design, manufacture and production on the basis of the technical contents disclosed in the disclosure are just customary technical means in the art for one of ordinary skilled in the art associated with the technical contents disclosed in the present disclosure, and the present disclosure should not be construed as insufficient disclosure.

Unless otherwise defined, technical or scientific terms used in the claims and the description shall have the ordinary meaning understood by one of ordinary skills in the art to which this invention belongs. "First", "second" and the like used in the description and claims of the present invention do not imply any order, quantity, or importance, but are merely used to distinguish different components. "One", "a/an" and the like do not imply any quantitative limitation, but rather means "at least one". "Including" or "comprising" and the like means that an element or item appearing before "including" or "comprising" covers an element or item and its equivalents listed after "including" or "comprising", and does not exclude other elements or items. "Connected", "coupled" and the like are not limited to physical or mechanical connections, nor are they limited to direct or indirect connections. The phrase "A is substantially equal to B" is intended to take into account the manufacturing tolerance, that is, the values of A and B can be within ±10% of each other.

For the sake of description, it can be appreciated that light propagates along an optical path from an optical "upstream" position to an optical "downstream" position in a light beam. Thus, the relative positions of optical elements in the optical path can also be described with these two terms.

A floating display apparatus generally includes an image display unit and an optical system. The image display unit presents an original image on an object plane of the optical system by means of direct display or indirect projection. The image light then forms a floating image in the air through the optical system. If a large-size floating display is intended, it is necessary to process larger optical elements, which will lead to a rapid increase of processing cost and a reduced accuracy of optical elements. Accordingly, a splicing display apparatus for floating image is provided, which comprises an image display unit and a plurality of optical systems to form a plurality of floating sub-images in space, and a complete floating image is formed by splicing the plurality of floating sub-images. This technical solution realizes seamless splicing of floating images while enabling lower manufacturing costs and making the floating display apparatus more compact.

FIG. 1 illustrates a schematic block diagram of a splicing display apparatus 100 for floating an image according to an embodiment of the present invention. Referring to FIG. 1, the splicing display apparatus 100 according to an embodiment of the present invention may include a display module 110 and a plurality of optical imaging modules $120_{1\sim n}$. The display module 110 may be configured to emit display light constituting a target image. The plurality of optical imaging modules $120_{1\sim n}$ may be configured to receive display light emitted from the display module 110 to form a floating image in the air. Each of the optical imaging module $120_i$ defines an object plane 10, a first image plane 15 and a second image plane 20. The display module 110 (especially the display plane thereof) is arranged at the object plane 10 of the plurality of optical imaging modules. The light rays emitted from the pixels on the display module 110 may be converged on the first image plane 15 in the y-direction, and converged on the second image plane 20 in the x-direction through at least one optical imaging module of the plurality of optical imaging modules $120_{1\sim n}$.

In embodiments of the present invention, the display module 110 may consist of a plurality of display units spliced together or may be a single display device. The single display device may be a single complete display area or have a plurality of independent display areas. In this way, the display module 110 may include a plurality of display portions arranged in the y-direction. Each display portion may be configured to display a corresponding portion of the target image. The target image displayed on the display module 110 and the floating image presented at the floating image plane (i.e., the second image plane 20) of the plurality of optical imaging modules $120_{1\sim n}$ may be in an upright imaging relationship in the y-direction.

Figure 2:
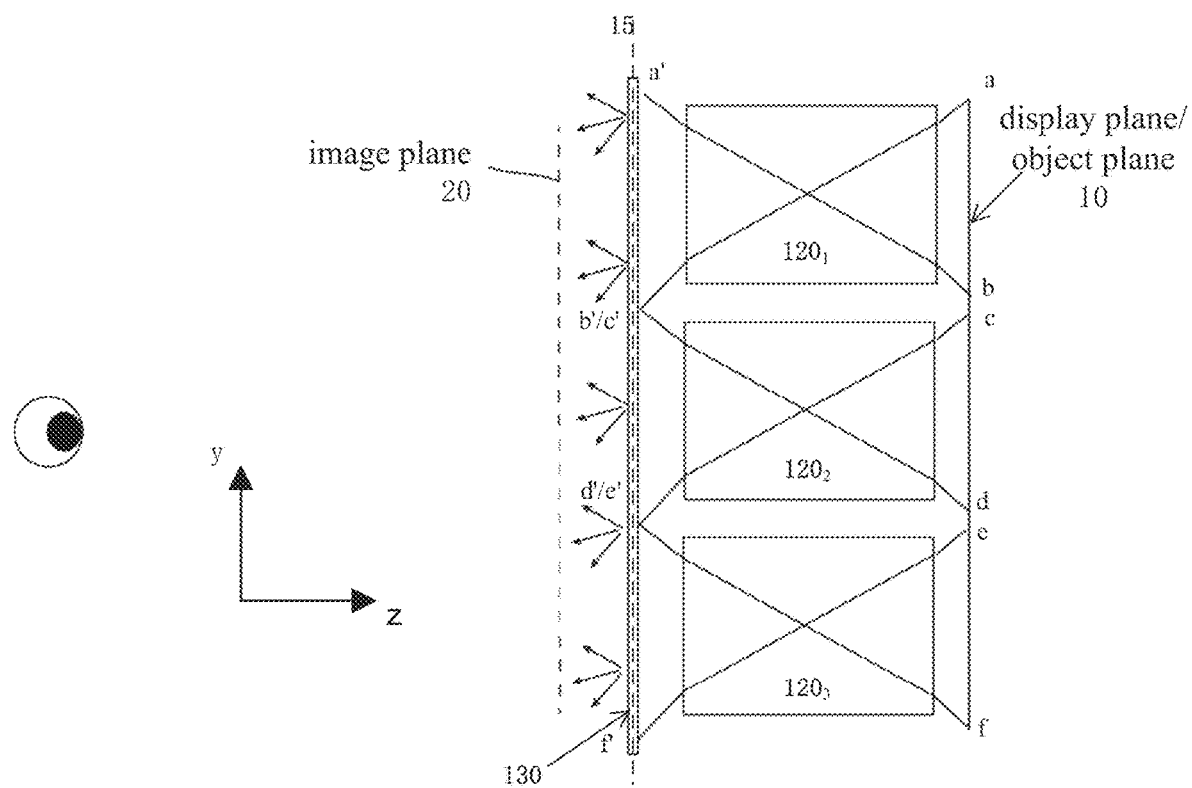
FIG. 2 illustrates a schematic diagram of a splicing display apparatus including a one-dimensional scattering screen according to an embodiment of the present invention.

The splicing display apparatus 100 according to embodiments of the present invention may also include a one-dimensional scattering screen 130 placed on the first image plane 15 for scattering light in the y-direction, as shown in FIG. 2. In embodiments of the present invention, the one-dimensional scattering screen 130 may be a complete scattering screen or consist of a plurality of individual scattering screens. In some embodiments of the present invention, the display plane of the display module 110 and the one-dimensional scattering screen 130 may be disposed parallel to each other.

Figure 3:
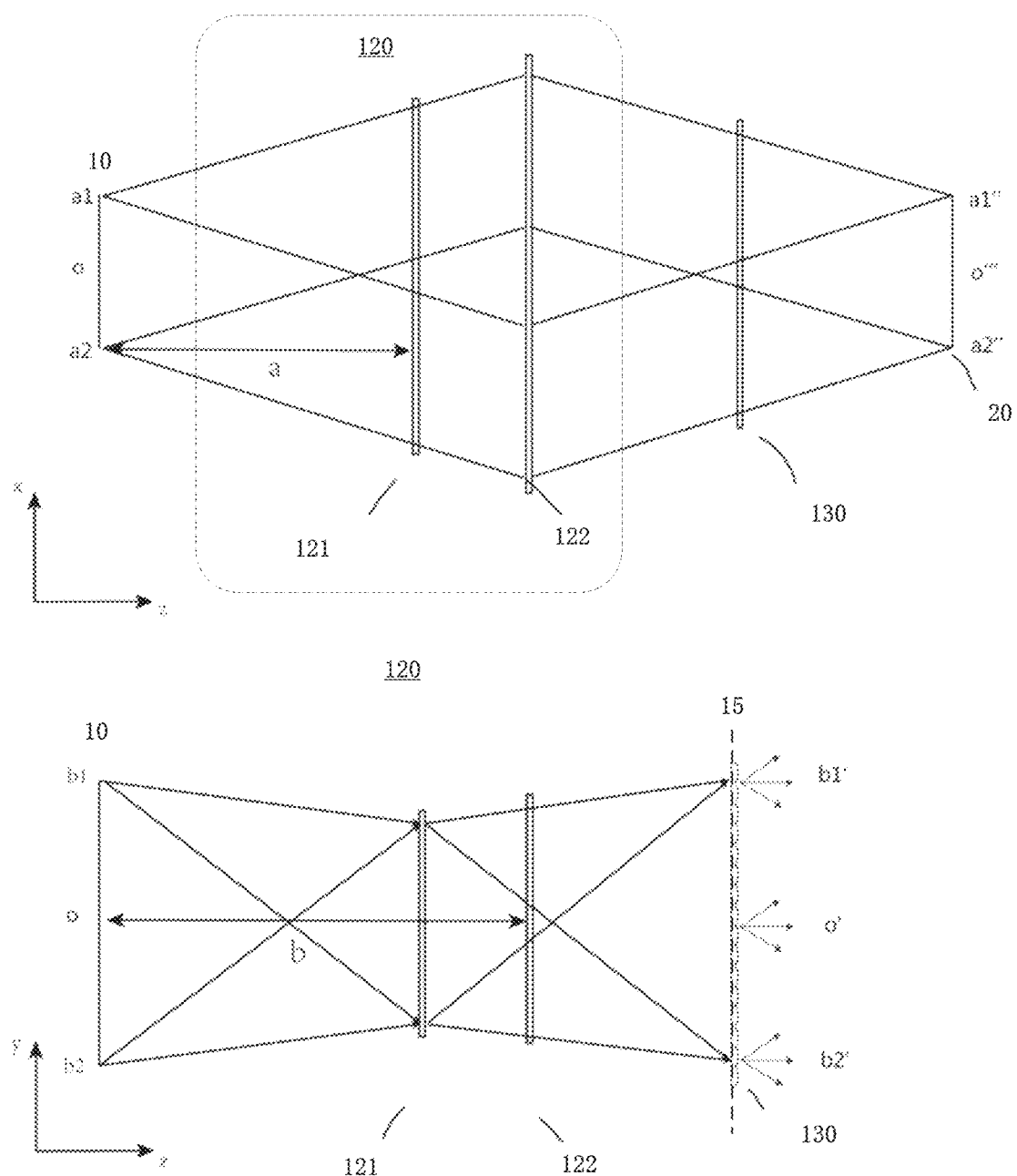
FIG. 3 illustrates a schematic diagram of the principle of propagation of rays, in a first direction and a second direction respectively, of the optical imaging module and the one-dimensional scattering screen according to an embodiment of the present invention.

FIG. 3 illustrates a schematic diagram of the principle of propagation of rays, in a first direction and a second direction respectively, of the optical imaging module 120 and the one-dimensional scattering screen 130 according to an embodiment of the present invention. The optical imaging module 120 may include a first one-dimensional conjugate imaging element 121 and a second one-dimensional conjugate imaging element 122, and define an object plane 10, a first image plane 15 and a second image plane 20. The first one-dimensional conjugate imaging element 121 may have microstructural units for imaging in the first direction (y-direction), so that light beams from the points (b1,o,b2) on the object plane 10 converge on the first image plane 15 in the y-direction. The one-dimensional scattering screen 130 may be placed on the first image plane 15 for scattering light rays in the y-direction. The second one-dimensional conjugate imaging element 122 may have microstructural units for imaging in the second direction (x-direction), so that light beams from the points (a1,o,a2) on the object plane 10 converge on the second image plane 20 in the x-direction.

The microstructural units of the first one-dimensional conjugate imaging element 121 and the microstructural units of the second one-dimensional conjugate imaging element 122 may be disposed orthogonally. The first direction and the second direction are orthogonal to a main optical axis of the optical imaging module 120, respectively. The first one-dimensional conjugate imaging element 121 may be disposed between the object plane 10 and the second one-dimensional conjugate imaging element 122 along the main optical axis. The first one-dimensional conjugate imaging element 121 and/or the second one-dimensional conjugate imaging element 122 may be transmissive or may be reflective. As an example, the first one-dimensional conjugate imaging element 121 and/or the second one-dimensional conjugate imaging element 122 may be a one-dimensional retroreflective screen, a one-dimensional grating transmission array, a one-dimensional holographic grating, or the like. The benefit of employing such conjugate imaging elements is that the relationship of positions (of the object and the image) is conjugate, the image is not enlarged, and there is no aberration.

In some embodiments of the present invention, the optical path between the one-dimensional scattering screen 130 and the first one-dimensional conjugate imaging element 121 may be substantially equal to the optical path between the object plane 10 and the first one-dimensional conjugate imaging element 121. The one-dimensional scattering screen 130 may scatter rays in the y-direction. Optionally, the optical path (distance) from the object plane 10 to the first one-dimensional conjugate imaging element 121 may be set to a, the optical path (distance) from the object plane 10 to the second one-dimensional conjugate imaging element 122 may be set to b, and b≤2a. The height of the floating image (distance from the one-dimensional scattering screen 130) is 2*(b−a). Optionally, the object plane 10 and the second image plane 20 of the optical imaging module 120 may be disposed in substantially symmetry with respect to the second one-dimensional conjugate imaging element 122. Optionally, the first one-dimensional conjugate imaging element 121 and the second one-dimensional conjugate imaging element 122 may be disposed in parallel with each other. Optionally, the optical imaging module 120 may have a one-dimensional aperture stop for limiting the height of light rays passing through the optical imaging module 120 in the y-direction without limiting light rays passing in the x-direction. Preferably, the first one-dimensional conjugate imaging element 121 may be disposed as such a one-dimensional aperture stop.

As shown, in the x-direction, the light rays emitted from the object points a1, o, a2 on the object plane 10 passes through the second one-dimensional conjugate imaging element 122, imaging as a1", o", a2", on the second image plane 20. In the y-direction, the light rays emitted from object points b1, o, b2 passes through the first one-dimensional conjugate imaging element 121, imaging on the one-dimensional scattering screen 130, forming image points b1', o', b2'; the light rays from image points b1', o', b2' are scattered in the y-direction by the scattering screen 130, thereby forming a larger range of visual angles in the y-direction. The image height of the optical imaging module 120 in the x-direction (on the second image plane 20) may be equal to the object height in the x-direction (on the object plane 10), and the image height in the y-direction (on the first image plane 15) may be equal to the object height in the y-direction (on the object plane 10) or may be greater than the object height in the y-direction (in the presence of a magnification optical system in the y-direction). In an embodiment of the present invention, the plurality of optical imaging modules $120_{1\sim n}$ may have the same structure.

The splicing display apparatus 100 for floating images according to an exemplary embodiment of the present invention has been described above. In the apparatus, floating images may be formed in the air by a display module and a plurality of imaging modules, and at the same time, a larger range of visual angles is formed in the second direction with a scattering screen, thereby enabling a large-size floating display. Such splicing display apparatus 100 apparently reduces the cost for implementing floating display of different sizes, since there is no need to design different optical imaging systems for floating images of specific sizes. Only display module, a proper number of imaging modules and a scattering screen need to be selected according to the required size of the floating image, and an optical element of small size is easier to process than an optical element of large size. In addition, such splicing display apparatus 100 has significantly reduced thickness and is more compact compared with the larger-sized floating display apparatus in the prior art.

It can be understood that since the physical structure and optical characteristics of the optical imaging module can be substantially the same with respect to the x direction, in order to further reduce the size of the optical element so as to facilitate processing, several sets of the above-mentioned splicing display apparatuses can also be further spliced in the x direction to form the optical element.

Due to the large light collection cone angle for light rays at the central field of view and the small light collection cone angle for light rays at the edge, for a single optical imaging module 120$i$, the central brightness is greater than the edge brightness, which may cause non-uniform brightness. In order to effectively improve non-uniform brightness, the light rays emitted from the pixels on the display module 110 may be imaged at the same point through a plurality of optical imaging modules $120_{1\sim n}$.

Figure 4:
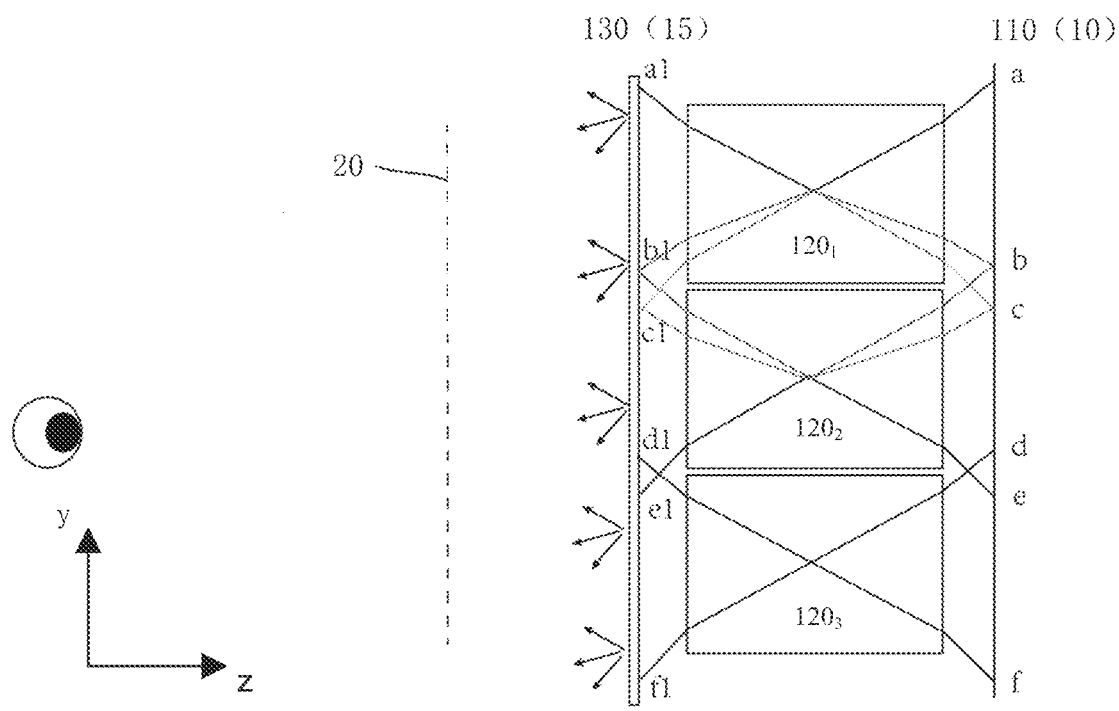
FIG. 4 illustrates a schematic diagram of pixels on the display module being imaged at the same point on a first image plane through a plurality of optical imaging modules.

Referring to FIG. 4, the pixels (for example, a, b, c, d, e, f) on the display plane of the display module 110 pass through a plurality of optical imaging modules $120_{1\sim n}$ (although only b, c are shown as passing through the first optical imaging module $120_1$ and the second optical imaging module $120_2$ in FIG. 4, those skilled in the art may understand that the light rays emitted from the pixels may pass through all of the plurality of optical imaging modules $120_{1\sim n}$), being imaged at the same point (for example, a1, b1, c1, d1, e1, f1) on the first image plane 15 (where the scattering screen 130 is placed).

Figure 5:
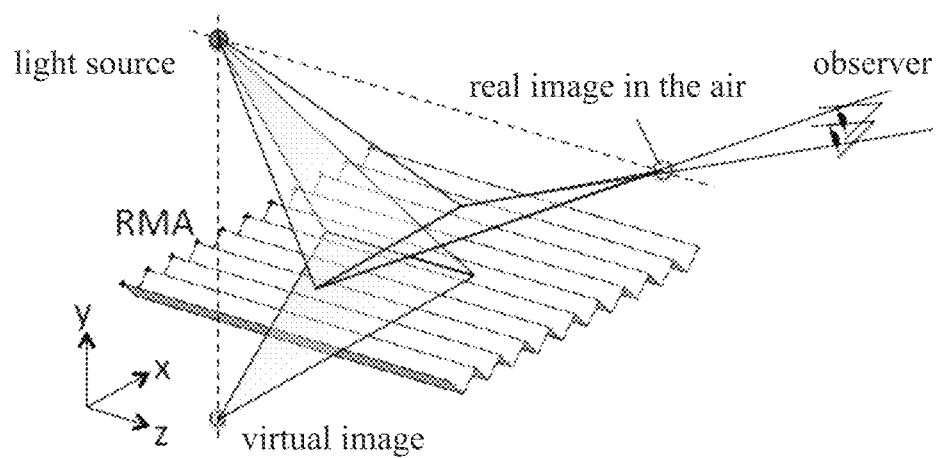
FIG. 5 illustrates an exemplary structure of a one-dimensional retroreflective screen.

In an optional embodiment of the present invention, at least one optical imaging module 120 of the plurality of optical imaging modules 1201~n further includes a beam splitting plate for reflecting light rays emitted from the object plane. The use of a beam splitting plate may have the following advantages: preventing the light emitted by the display module from directly entering human eyes; folding the optical path (for example, converting the optical length in the z-direction to the y-direction), thereby reducing the thickness of the optical module. In an optional embodiment of the present invention, the first one-dimensional conjugate imaging element 121 and the second one-dimensional conjugate imaging element 122 may be retroreflective screens (RMA). An example of the one-dimensional retroreflective screen is shown in FIG. 5, where a portion of the light rays illuminated arbitrarily on the plane of the one-dimensional retroreflective screen is reflected at the original angle.

Figure 6:
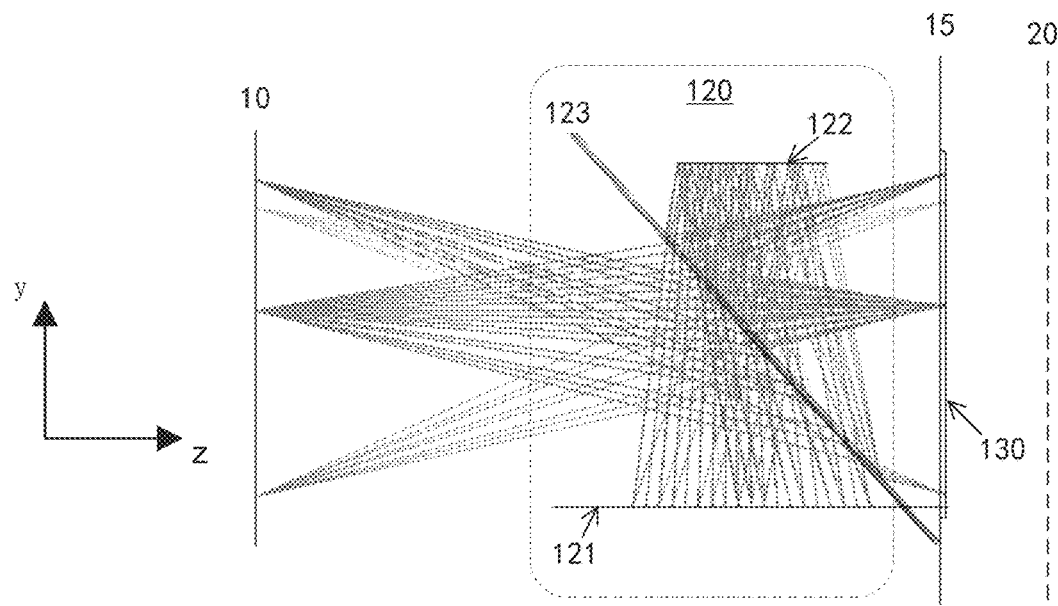
FIG. 6 illustrates a schematic block diagram of an optical imaging module according to an optional embodiment of the present invention.

FIG. 6 illustrates a schematic block diagram of an optical imaging module according to an optional embodiment of the present invention. As shown, the display light on the display plane/object plane 10 may be reflected by the beam splitting plate 123 and then enter the first one-dimensional conjugate imaging element (one-dimensional retroreflective screen) 121, may be reflected by the first one-dimensional conjugate imaging element 121 and then be transmitted through the beam splitting plate 123 to enter the second one-dimensional conjugate imaging element (retroreflective screen) 122, and may be reflected by the second one-dimensional conjugate imaging element 122 and then be reflected by the beam splitting plate 123 to form floating images on the second image plane 20.

In an optional embodiment of the present invention, the image height of the optical imaging module 120 in the y-direction on the first image plane 15 is greater than or equal to the spacing between the first one-dimensional conjugate imaging element 121 and the second one-dimensional conjugate imaging element 122. As an example, the image height of the optical imaging module 120 in the y-direction on the first image plane 15 may be less than 200 mm; the spacing between the first one-dimensional conjugate imaging element 121 and the second one-dimensional conjugate imaging element 122 may be less than 200 mm.

As shown in FIG. 6, in this embodiment, the beam splitting plate 123 may be disposed obliquely between the first one-dimensional conjugate imaging element 121 and the second one-dimensional conjugate imaging element 122 and between the object plane 10 and the first image plane 15 of the optical imaging module 120. The first one-dimensional conjugate imaging element 121 and the second one-dimensional conjugate imaging element 122 may be disposed in parallel to each other. The display module 110 (especially the display plane thereof) placed at the object plane 10 of the optical imaging module 120 and the first and second one-dimensional conjugate imaging elements 121 and 122 may be disposed perpendicular to each other. The beam splitting plate 123 may be disposed in angle with the display plane, the first one-dimensional conjugate imaging element 121 and the second one-dimensional conjugate imaging element 122 respectively, preferably at an angle of 45°.

In an optional embodiment, the optical path between the one-dimensional scattering screen 130 and the first one-dimensional conjugate imaging element 121 may be substantially equal to the optical path between the display module 110 and the first one-dimensional conjugate imaging element 121. The floating images at the display module 110 and the second image plane 20 may be disposed in substantial symmetry with respect to the second one-dimensional conjugate imaging element 122. Preferably, the first one-dimensional conjugate imaging element 121 may be set as an aperture stop in the optical imaging module 120 for limiting the height of light rays passing through the optical imaging module 120 in the y-direction, for example, setting aperture for passing through rays in the y-direction to 100 mm or less.

Figure 7:
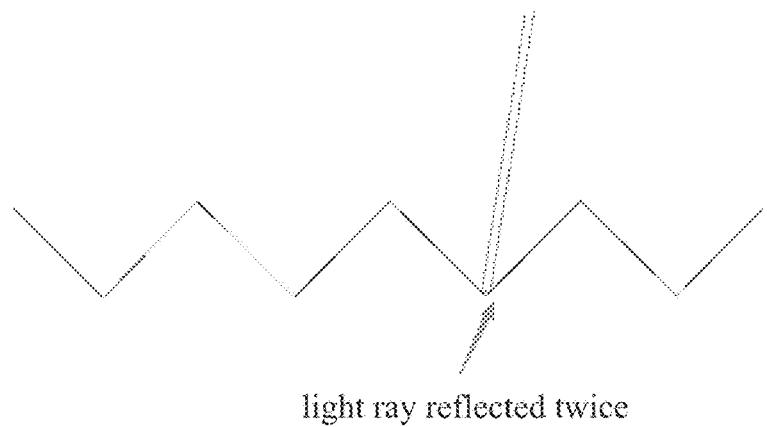
FIG. 7 illustrates a schematic diagram of light rays reflected twice by the retroreflective screen and light rays reflected once by the retroreflective screen.
Figure 7:
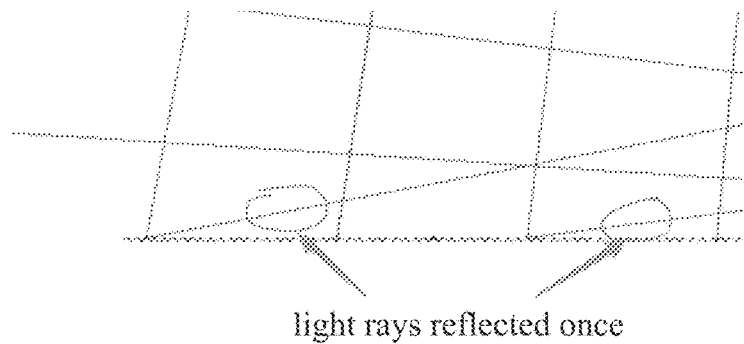
Figure 8:
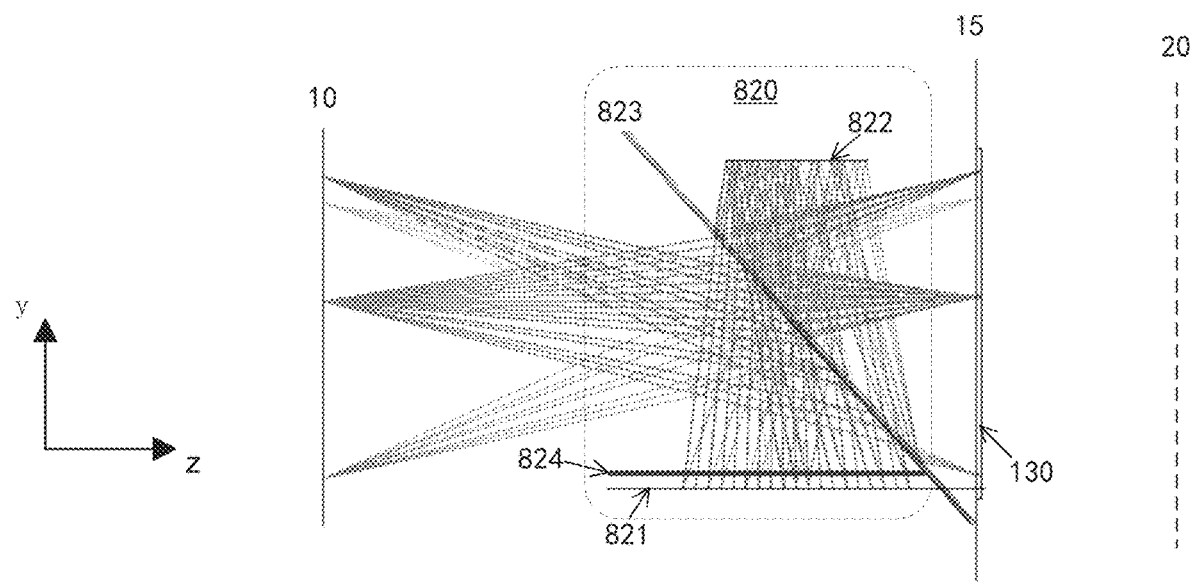
FIG. 8 illustrates a schematic block diagram of an optical imaging module according to an optional embodiment of the present invention.
Figure 9:
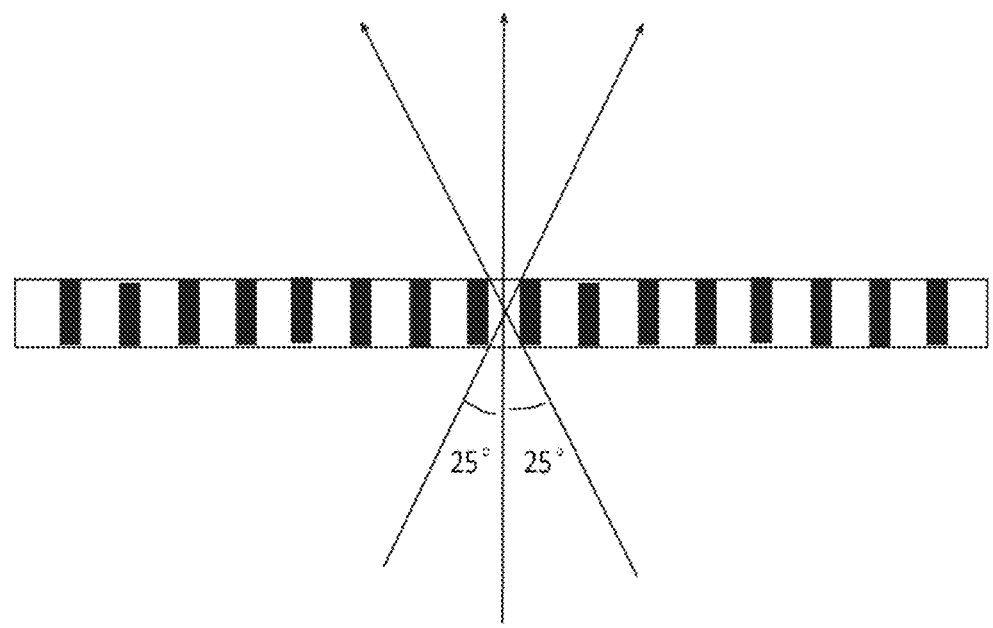
FIG. 9 illustrates an examplary construction of an ultra-fine louver structure.

Referring to FIG. 7, for a retroreflective screen, the rays reflected twice by the microstructure of the retroreflective screen are imaging light rays, while the light rays reflected once by the microstructure of the retroreflective screen are stray light that may form ghost images. Therefore, as shown in FIG. 8, in a preferred embodiment, the optical imaging module 820 may further include a filter element 824 disposed between the first one-dimensional conjugate imaging element 821 and the beam splitting plate 823 to serve as a light ray angle selector, which passes through light rays with small angles and absorbs light rays with large angles. The filter element 824 may be a microlouver structure or may be achieved by coating. An example of a microlouver structure is shown in FIG. 9, which may be used to pass through light rays with small angles (usually rays of angles of within the range of ±25 degrees) and absorb light rays with large angles, so that light rays which are normally displayed may pass through, and light rays which are reflected once are absorbed due to their large angles, thereby eliminating ghost images. It may be understood that the filter element 824 may also be further disposed between the second one-dimensional conjugate imaging element 822 and the beam splitting plate 823 to eliminate ghost images produced by the reflection produced once by the second one-dimensional conjugate imaging element 822.

Figure 10:
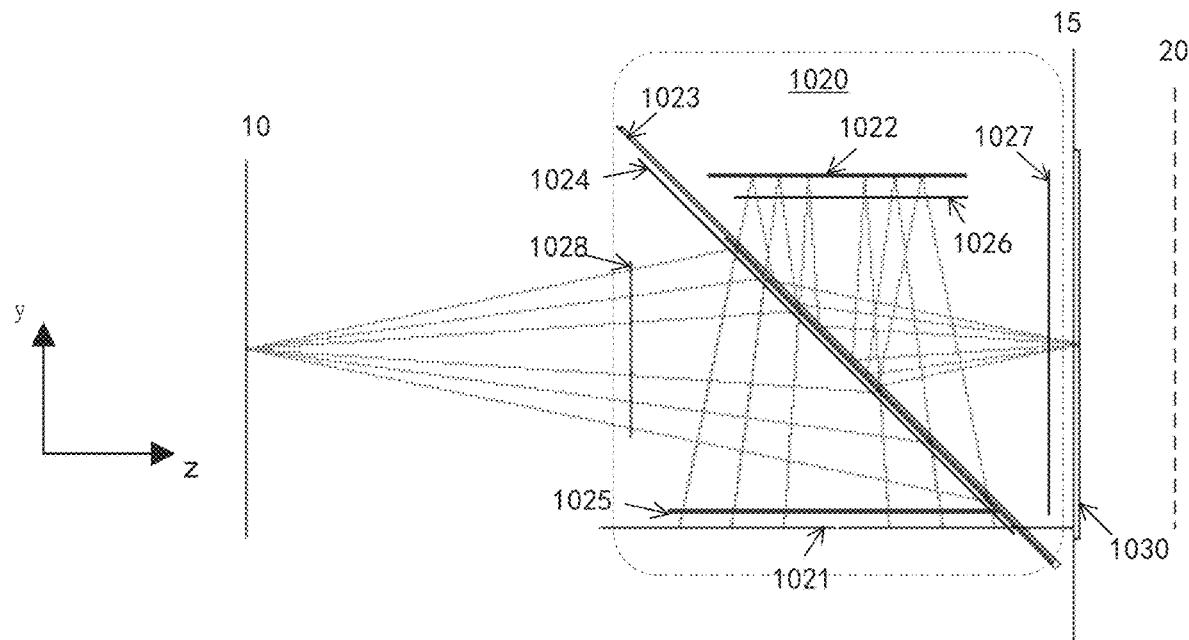
FIG. 10 illustrates a schematic block diagram of an optical imaging module according to another optional embodiment of the present invention.

In another optional embodiment of the present invention, ghost images may be eliminated through polarized light absorption. Referring to FIG. 10, in addition to the polarizing beam splitting plate 1023 disposed between the first retroreflective screen 1021 and the second retroreflective screen 1022, the optical imaging module 1020 may further include a first half-wave (½λ) plate 1025, a second half-wave plate 1026 and a polarizer 1027. The polarizing beam splitting plate may be achieved by coating the polarizing beam splitting film on the plate or attaching the polarizing beam splitting film (APF) 1024 to the surface of the plate to form the polarizing beam splitting plate 1023. The first half-wave plate 1025 may be disposed on the incident side of the first retroreflective screen 1021 (for example, between the first retroreflective screen 1021 and the beam splitting plate 1023), while the second half-wave plate 1026 may be disposed on the incident side of the second retroreflective screen 1022 (for example, between the second retroreflective screen 1022 and the beam splitting plate 1023). The angle between the optical axis direction of the half-wave plates 1025 and 1026 and the direction of the microstructure of the one-dimensional retroreflective screen may be 22.5° or 67.5°. The polarizer 1027 may be disposed between the beam splitting plate 1023 and the second image plane 20.

As shown in FIG. 10, assuming that the light emitted from the display plane (i.e., the object plane 10) is s-polarized light (0 degree direction) (the present application is not limited thereto; the light emitted from the display plane may also be natural light), the light is reflected after illuminated onto the polarizing beam splitting plate 1023, is illuminated onto the half-wave plate 1025 to become 45-degree linearly polarized light. Then the light is illuminated onto the first retroreflective screen 1021 and is reflected twice by the right-angle microstructure, and the light is still 45-degree linearly polarized light. Then the light passes through the first half-wave plate 1025 again and is converted into p-polarized light (90-degree direction), passes through the polarizing beam splitting plate 1023 and is illuminated onto the half-wave plate 1026 to become 45-degree linearly polarized light. Then the light is illuminated onto the second retroreflective screen 1022, is reflected twice by the right-angle microstructure, and the light is still 45-degree linearly polarized light. The light passes through the second half-wave plate 1026 again and becomes s-polarized light (0-degree direction), and then is reflected again by the polarizing beam splitting plate 1023 and is illuminated onto the polarizer 1027. The polarizer 1027 passes through the s-polarized light and illuminates it onto the scattering screen 1030 placed on the first image plane 15.

Figure 11:
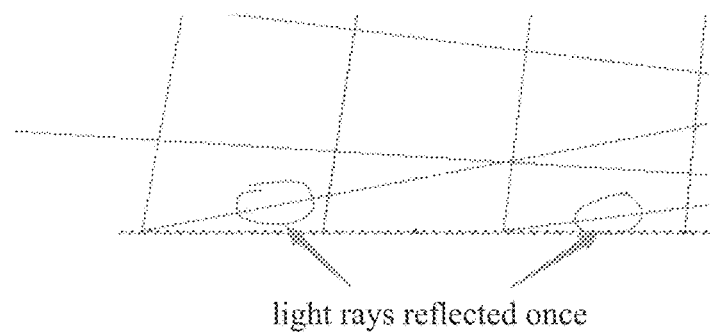
FIG. 11 illustrates a schematic diagram of light rays reflected once by the retroreflective screen.

For the light rays reflected once by the first retroreflective screen 1021 (ghost image light rays, as shown in FIG. 11), they are still s-polarized light (0-degree direction) after passing through the first half-wave plate 1025 twice, being retroreflected in the original path by the beam splitting plate 1023 and unable to pass through. In this example, the polarizer 1027 is set to pass through s-polarized light while absorbing p-polarized light. Optionally, the polarizer 1027 may be a circular polarizer. Such arrangement may prevent the external light rays incident on the optical imaging module from being reflected again, thereby achieving an extinction effect.

Optionally, the second half-wave plate 1026 may be disposed, facing the scattering screen 1030, on the surface of the polarizing beam splitting plate 1023. The polarizer 1027 passes through p-polarized light while absorbing s-polarized light. Assuming that the light emitted from the display plane (i.e., object plane 10) is s-polarized light, it is reflected after being illuminated onto the polarizing beam splitting plate 1023, illuminated onto the first retroreflective screen 1021 and get reflected, passes through the first half-wave plate 1025 twice and get converted into p-polarized light, passes through the polarizing beam splitting plate 1023, then passes through the second half-wave plate 1026 and get converted into 45-degree polarized light, illuminated onto the second retroreflective screen 1022 and get reflected, passes through the second half-wave plate 1026 again and becomes s-polarized light, reflected again by the polarizing beam splitting plate, passes through the second half-wave plate 1026 for the third time and becomes p-polarized light, and passes through the polarizer 1027 and get illuminated onto the scattering screen 1030 placed on the first image plane 15.

Optionally, the optical imaging module 1020 may further include a one-dimensional aperture stop 1028 for limiting the height of light rays passing through the optical imaging module 1020 in the y-direction without limiting the rays passing in the x-direction. The aperture stop 1028 may be set separately (as shown), or may be integrated with the first retroreflective screen 1021, as mentioned above.

Figure 12:
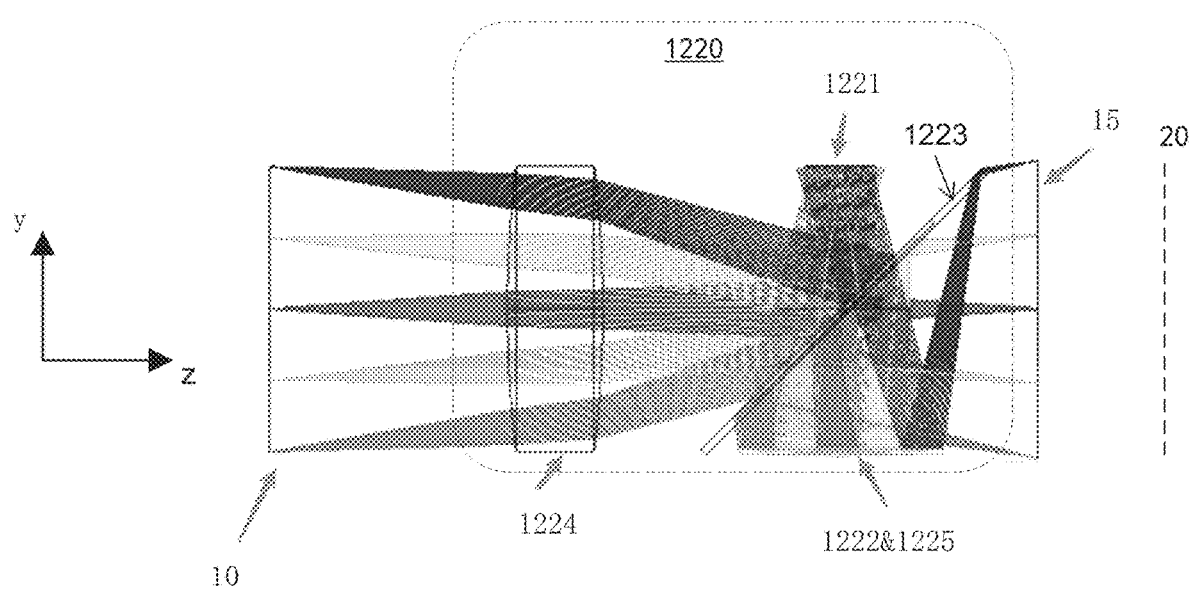
FIG. 12 illustrates a schematic block diagram of an optical imaging module according to yet another optional embodiment of the present invention.
Figure 13:
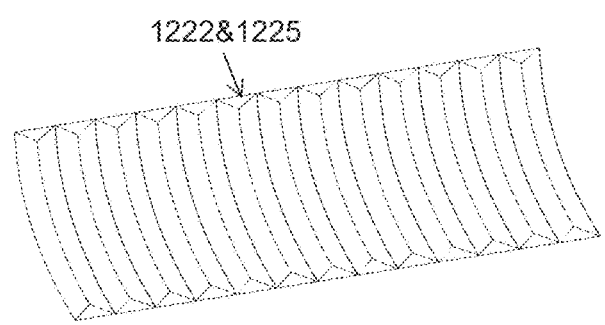
FIG. 13 illustrates an exemplary structure of cylindrical serrated grating.

Optionally, the optical imaging module 1220 may further include one or more lenses (or groups of lens). Referring to FIG. 12, in addition to the first retroreflective screen 1221, the second retroreflective screen 1222 and the beam splitting plate 1223, the optical imaging module 1220 may further include a first lens 1224 and a second lens 1225. The first lens 1224 and the second lens 1225 may be cylindrical lenses with diopter only in the y-direction. Adding lenses may cause the optical imaging module 1220 to have a magnifying effect in the y-direction, that is, the image height on the first image plane 15 is greater than the object height on the object plane. The first lens 1024 may be disposed between the object plane 10 and the beam splitting plate 1223, and the second lens 1225 may be disposed between the second retroreflective screen 1222 and the beam splitting plate 1223. Preferably, the second lens 1225 and the second retroreflective screen 1222 may be integrally formed. For example, a cylindrical mirror and a one-dimensional retroreflective screen may be integrally formed into a cylindrical serrated grating to be used as the second lens 1225 and the second retroreflective screen 1222. The cylindrical serrated grating has a curved surface in the y-direction and a one-dimensional serrated structure, which is an isosceles triangular structure with a vertex angle of 90 degrees, in the x-direction, as shown in FIG. 13.

Figure 19:
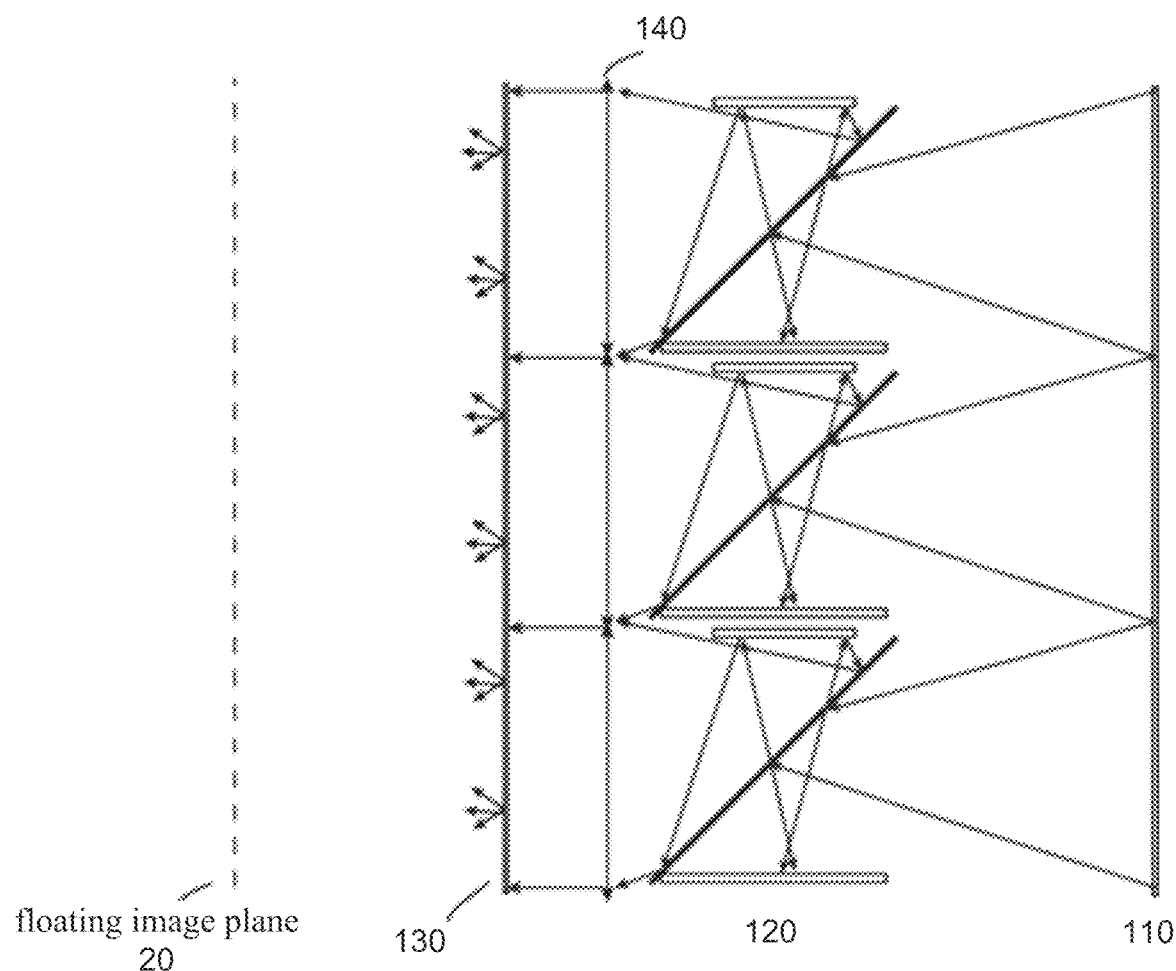
FIG. 19 illustrates a schematic diagram of a splicing display apparatus including an optional ray deflection unit.

Optionally, referring to FIG. 19, the splicing display apparatus 100 may further include one or more ray deflection units 140 for collimating the rays emitted from the optical imaging module 120. The collimated rays pass through the scattering screen 130, obtaining a more uniform distribution of field of view. Preferably, the ray deflection units 140 may be equally spaced Fresnel lenses to avoid seams between lenses being presented in floating images. For example, the ray deflection unit 140 may be a TIR Fresnel lens.

Figure 14:
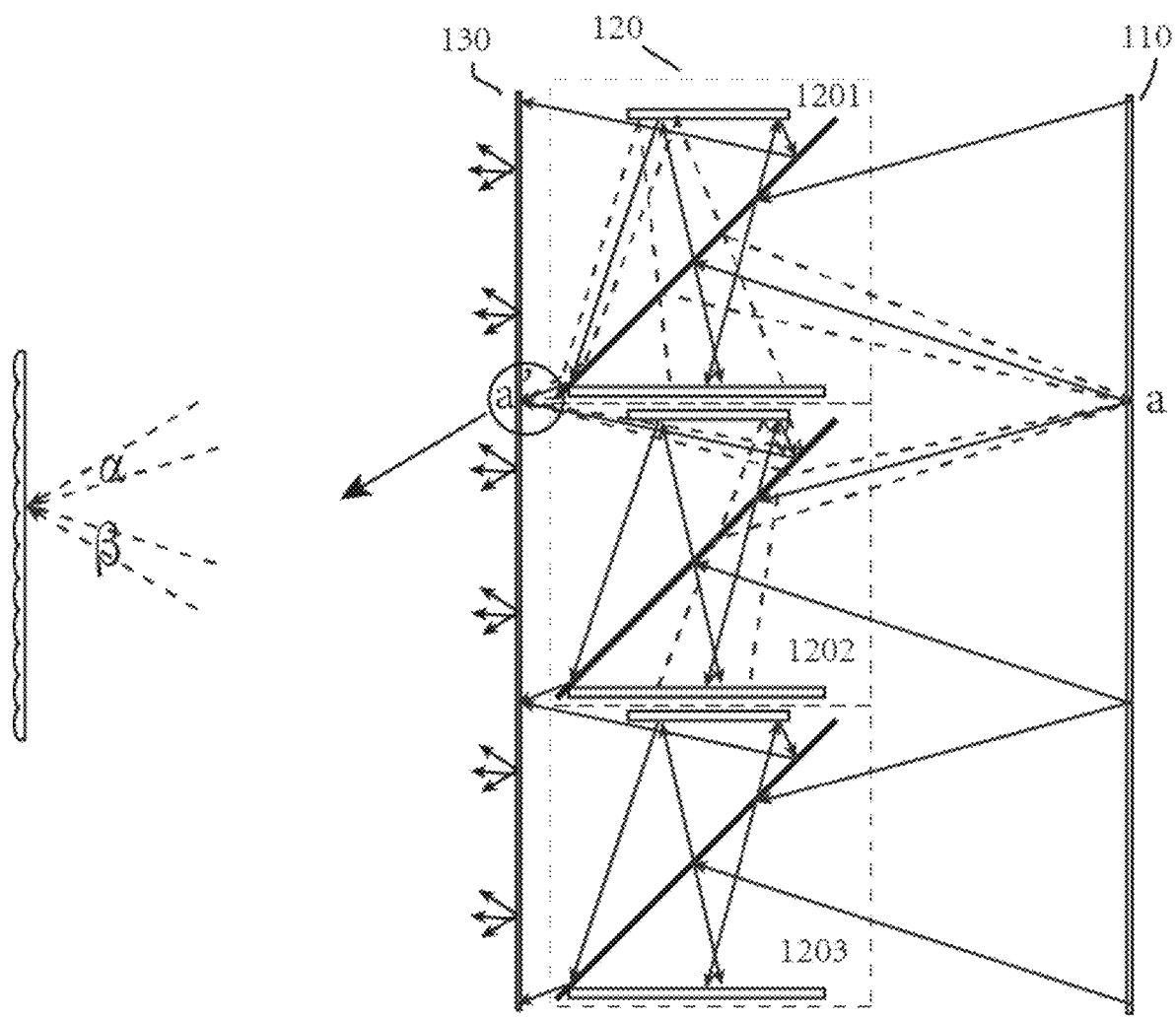
FIG. 14 illustrates a schematic diagram of the structure of a splicing display apparatus according to a preferred embodiment of the present invention.

Preferably, the display module 110 is a single flat panel display, and the display module is a single complete display area. The plurality of optical imaging modules 120 adopt a reflective structure including two orthogonal one-dimensional retroreflective screens and a beam splitting plate, as shown in FIG. 14. Part of the light emitted from a pixel a on the display is imaged through the optical imaging module 1201, and another part of the light is imaged through the optical imaging module 1202. They finally get imaged as the same image point a' on the scattering screen 130. The light beam passing through the optical imaging module 1201 only has a downward viewing angle, and the light beam passing through the optical imaging module 1202 only has an upward viewing angle. Due to the splicing requirements of such reflective structure, part of the light emitted from pixel a is always blocked by the retroreflective screen, resulting in the loss of part of the field of view. Thus, the function of the one-dimensional scattering screen 130 is to diffuse the light rays from the image point a' in the y-direction, thereby obtaining a continuous field of view of a large angle in the y-direction. For splicing in the x-direction, since there is no block by physical structures such as retroreflective screens, it is easy to obtain a continuous field of view of a large angle without the need for a scattering screen to diffuse the light beam. The advantages of employing such structure are as follows: the optical system is an aberration-free system, and there is no need to correct aberrations such as field curvature; the structure is simple; the object plane and image plane are equally large in both x-direction and y-direction, and there is no need to perform additional transformations to scale the images. In addition, since the display module is a complete single image, there is no need to perform additional splicing processing on the image, and there is no need to perform one-to-one splicing and alignment processing for each optical imaging module and display module, simplifying manufacturing and reducing cost. At the same time, the sizes of cone angles of the light beams passing through the central and edge pixels of the optical imaging module are balanced, so that the energies of the light beams formed by illuminating onto different pixels of the scattering screen 130 are close to each other and the brightness is uniform.

Figure 20:
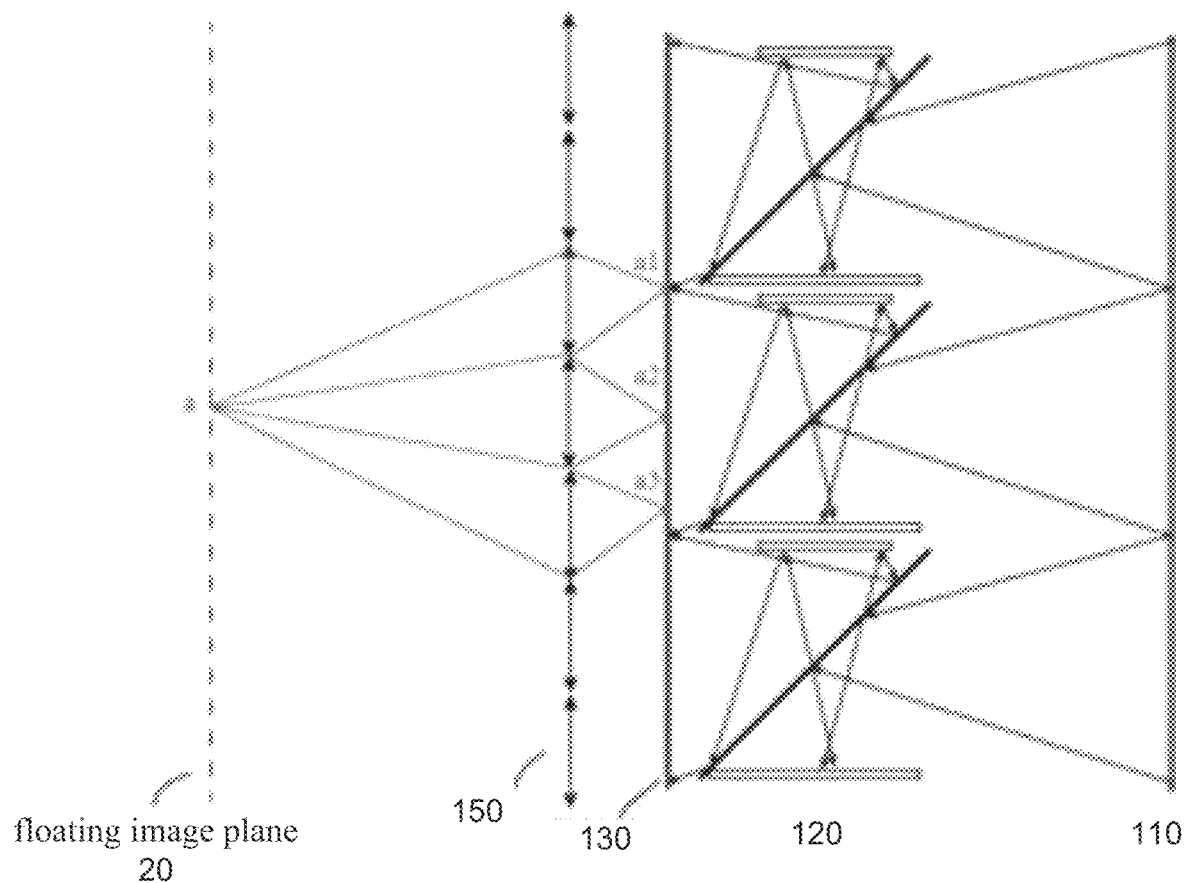
FIG. 20 illustrates a schematic diagram of a splicing display apparatus including an optional array of lenses.

Optionally, referring to FIG. 20, the splicing display apparatus 100 may further include an array of lens 150 disposed in front of the scattering screen 130, wherein in the y-direction, the image of the display module 110 is projected onto the scattering screen 130 through the optical imaging module 120. Each sub-lens in the array of lens 150 corresponds to an image area and is used to display a part of the floating image. The light emitting points representing the same image information on the scattering screen 130 converge into one point in space through different sub-lenses, thereby achieving the formation of a floating image plane in the y-direction, which coincides with the floating image plane 20 formed in the x-direction. In this way, it may facilitate to solve spatial positioning problem of the floating images in the y-direction.

Figure 21:
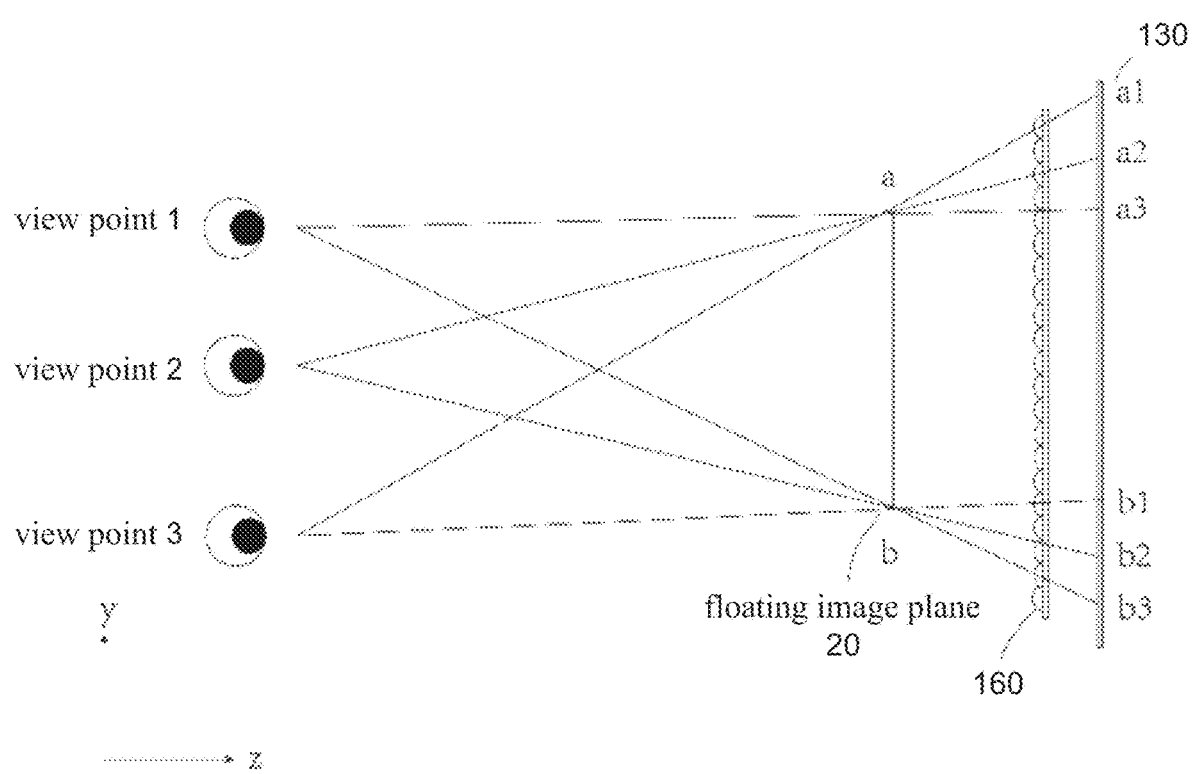
FIG. 21 illustrates a schematic diagram of a portion of a splicing display apparatus including an optional array of micro-lenses.

Optionally, the splicing display apparatus 100 may further include an array of micro-lens 160 disposed in front of the scattering screen 130. In the y-direction, the image of the display module 110 is projected onto the scattering screen 130 through the optical imaging module 120. Using the principle of multi-view three-dimensional display, human eyes see different areas on the scattering screen through the array of micro-lens at different viewing zone positions. As shown in FIG. 21, the image seen at the observation position at view point 1 is a3b3, the image seen at the observation position at view point 2 is a2b2, and the image seen at the observation position at view point 3 is a1b1. In this way, although the observation positions of human eyes in the y-direction in space are different, the position of the floating image plane seen is fixed (keeps to be ab), and the image plane perceived by the human eyes is coincident with the floating image plane 20 formed on the horizontal plane by the optical imaging module. In this way, it may also solve spatial positioning problem of the floating images in the y-direction.

Figure 22:
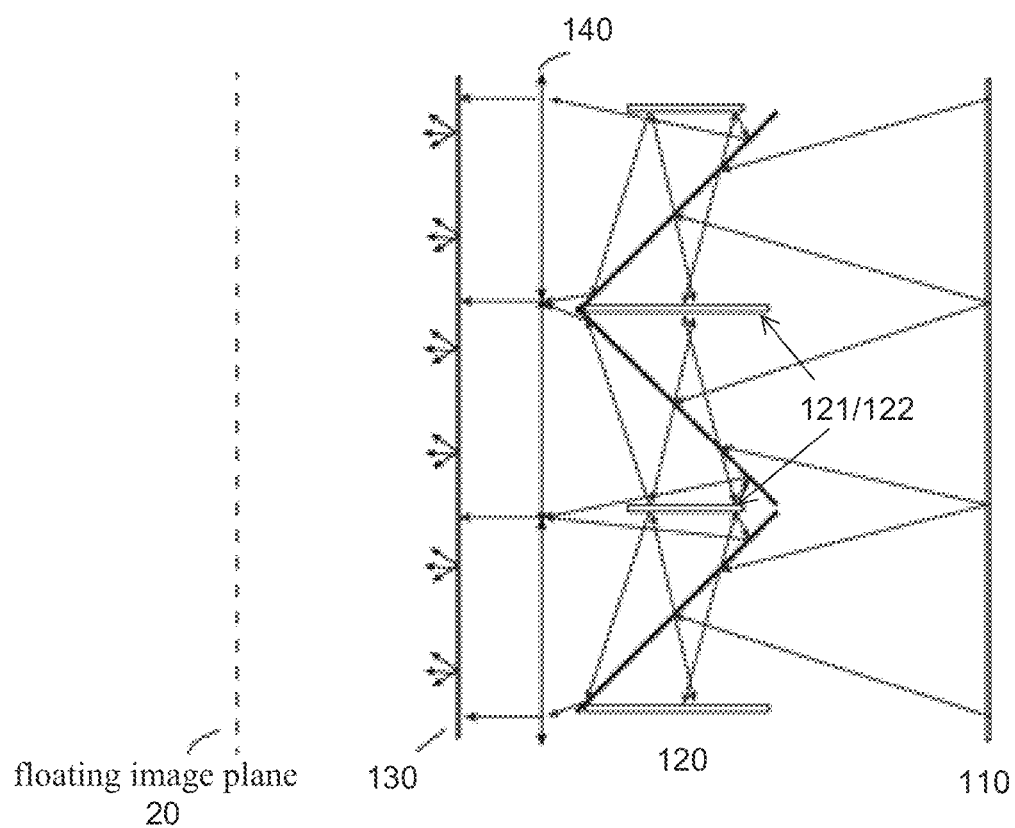
FIG. 22 illustrates a schematic diagram of a splicing display apparatus optionally including optical imaging modules in mirror arrangement.

Optionally, referring to FIG. 22, a plurality of optical imaging modules 120 in the splicing display apparatus 100 may be disposed in mirror arrangement in the y-direction, so that the conjugate imaging elements 121 or 122 may be reused, which may reduce the size of the parts spliced by the plurality of optical imaging modules 120, and may also reduce costs.

According to another exemplary embodiment of the present invention, a multi-layer display device is also provided.

Figure 15:
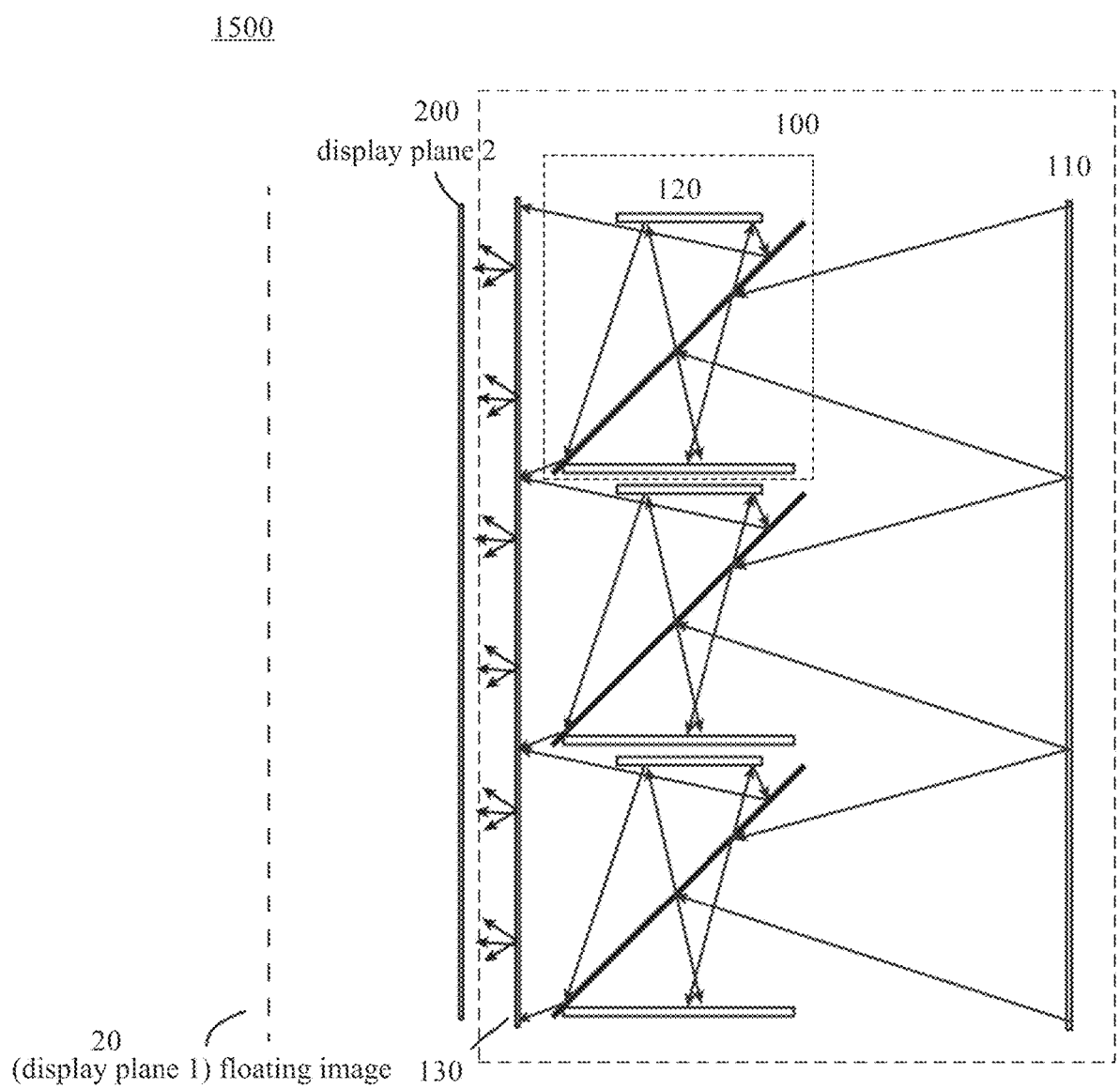
FIG. 15 illustrates a schematic diagram of a multi-layer display device according to an embodiment of the present invention.

FIG. 15 illustrates a schematic diagram of a multi-layer display device 1500 according to an embodiment of the present invention.

Figure 16:
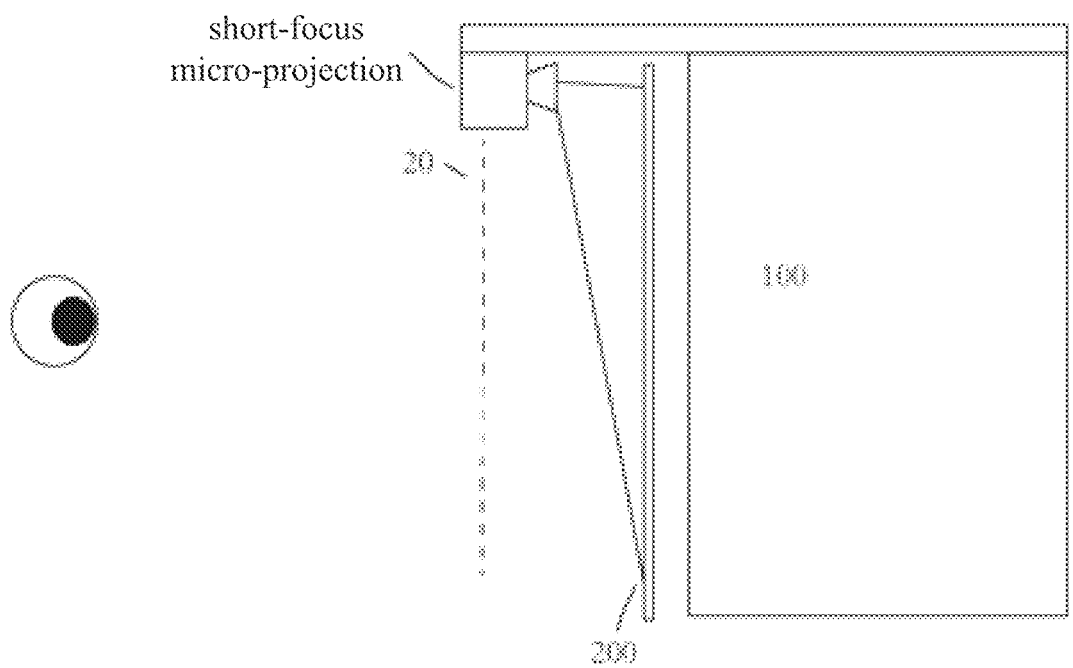
FIG. 16 illustrates a schematic diagram of a transparent display apparatus implemented by micro-projection.

The multi-layer display device 1500 may include the splicing display apparatus 100 and a transparent display apparatus 200 as previously described. The transparent display apparatus 200 may be disposed on the outgoing side (optically downstream) of the splicing display apparatus 100. The display plane of the transparent display apparatus 200 and the floating image plane 20 of the splicing display apparatus 100 are located at different positions, specifically located between the floating image plane 20 and the splicing display apparatus 100. The transparent display component 200 may have a high transmittance, such as a transparent OLED/LED/LCD display or a film (slide). The transparent display apparatus 200 may also be obtained by providing a transparent film (with film haze less than 5%) in front of the splicing display apparatus 100 and projecting an image through micro-projection, as shown in FIG. 16. Alternatively, the transparent film may be angularly selective for light, scattering light rays with large angles (a projected image) and directly passing through light rays with small angles (a floating image).

Figure 17:
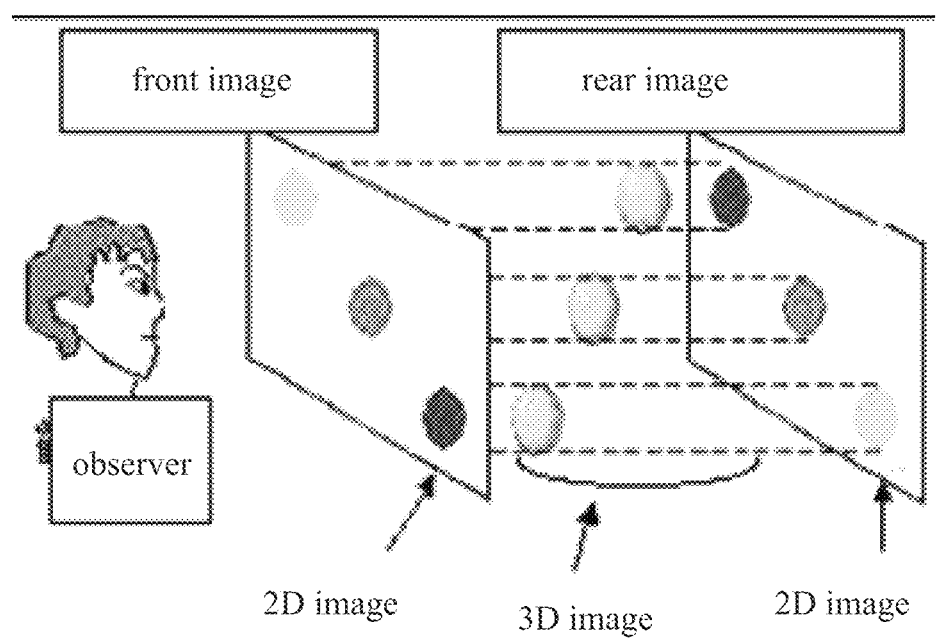
FIG. 17 illustrates a schematic diagram of naked-eye 3D display implemented by the multi-layer display device.

The multi-layer display device 1500 according to an exemplary embodiment of the present invention is described above. The multi-layer display device 1500 has a display plane 1 and a display plane 2. The splicing display apparatus 100 can form a floating image at the display plane 1 (image plane 20), and the transparent display apparatus 200 can display different information at the display plane 2. As such, secondary information may be displayed on the display plane 2 while primary information may be presented at the display plane 1, thereby enhancing the efficiency and experience of people in obtaining information. Alternatively, images of the same size can be displayed on the display plane 1 and the display plane 2, and darkness and color differences can be caused by different distances of the objects from the observer, so that the front and back object images can be overlapped together for a stereoscopic perception of the observer, thus realizing naked-eye 3D display, as shown in FIG. 17.

Figure 18A:
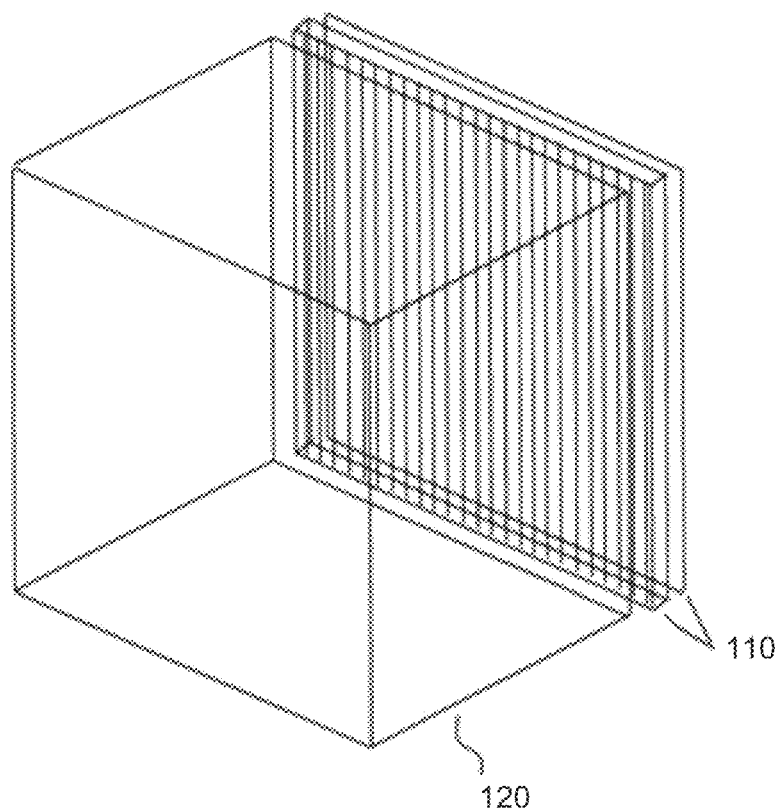
FIGS. 18A-18C illustrate descriptive schematic diagrams of a display module adopting a three-dimensional display.
Figure 18B:
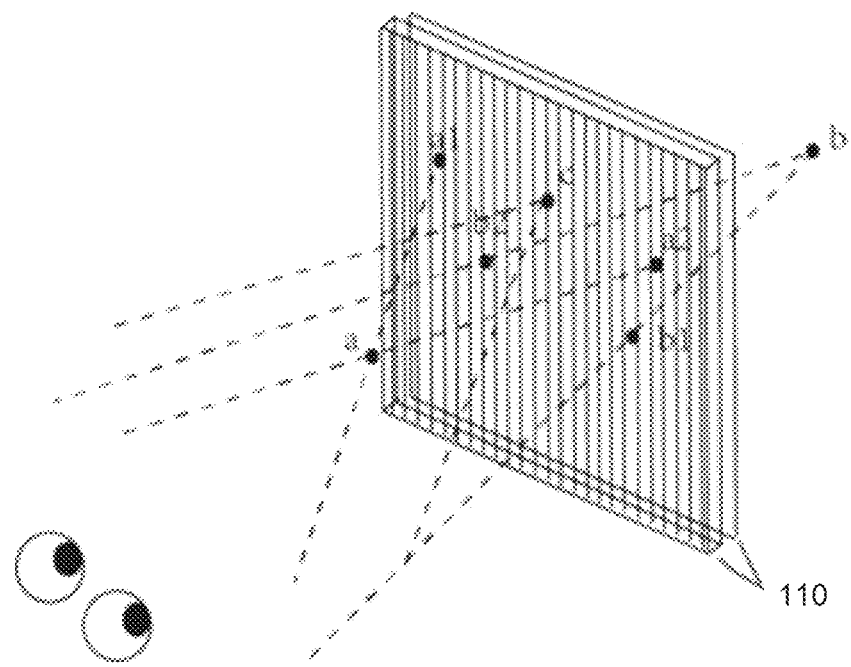
Figure 18C:
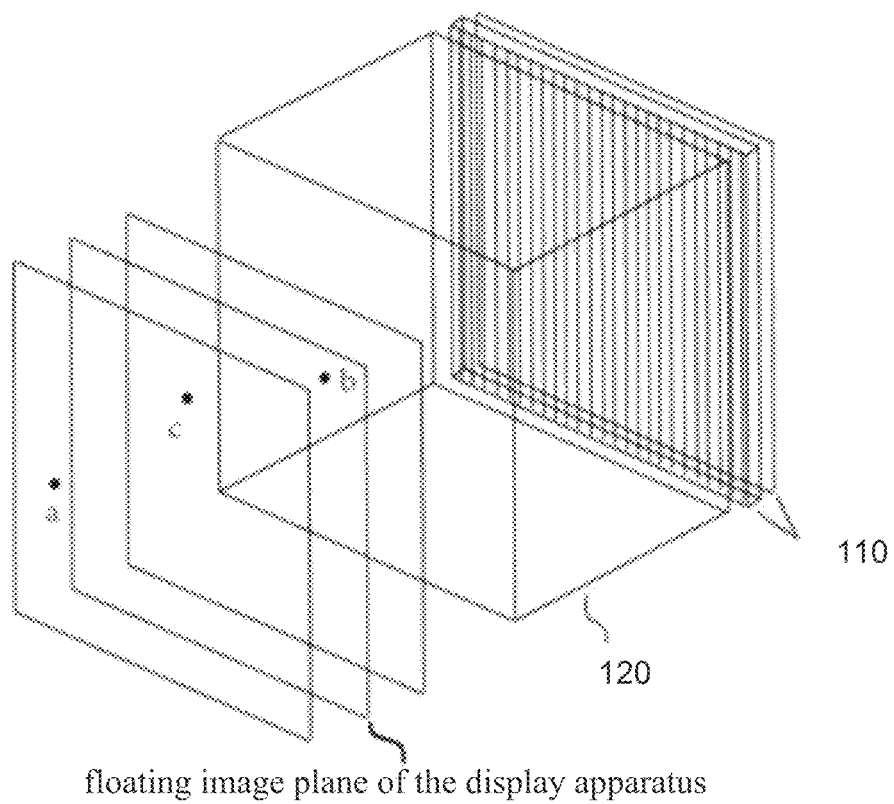

Optionally, the display module 110 may also be a naked-eye three-dimensional display, which may be a multi-view autostereoscopic display or a light field display. As shown in FIG. 18A, a common naked-eye three-dimensional display is composed of a flat panel display and a micro-optical unit, which may be a micro-lens or a slit grating. The flat panel display generates images with parallax, which are sent to the left and right eyes of the observer after passing through the micro-optical unit, so that stereoscopic perception can be produced by means of the binocular parallax effect of human eyes. As shown in FIG. 18B, a point "a1" on the display module 110 enters the right eye and a point "a2" on the display module 110 enters the left eye. The point seen by the human eyes is a point "a", which is in front of the screen, due to the binocular parallax principle. A point "b1" on the display screen enters the right eye and a point "b2" on the display screen enters the left eye. The point seen by the human eyes is a point "b", which is behind the screen, due to the binocular parallax principle. The left and right eyes together see a point "c" on the screen, so the observer feels that the position of the point "c" is on the screen. Therefore, the 3D image presented by the traditional naked-eye 3D display is a 3D image within a certain range of depths in front of and behind the screen, with center of the depths in the screen. Since the human will focus his/her eyes on the physical screen of the three-dimensional display when watching, he/she cannot perceive the floating three-dimensional image in space, which affects the experience.

The display module 110 of the present invention can adopt a multi-view/light field display, which can solve the problem very well. The screen plane of the multi-view/light field display is projected into the space through the optical imaging module 120 of the present invention to form a floating image plane. By displaying a parallax image on the multi-view/light field display, a 3D image within a certain range in front of and behind the floating image plane with the center of depths in the floating image plane can just be formed in the space. As shown in FIG. 17C, on the floating image plane, the point "a" is on the front depth-of-field plane, the point "b" is on the back depth-of-field plane, and the point "c" is on the floating image plane of the display apparatus, so that the 3D image formed thereby is completely floating in the air, which presents a better experience of 3D effect.

The splicing display apparatus, the optical imaging module used therein, and the multi-layer display device according to exemplary embodiments of the present invention are described above in details. Advantages of the present invention include the following: 1) The single optical imaging module in the splicing display apparatus has a simple structure, and the required optical elements are small in size and easy to process, which may effectively reduce costs; 2) A display module with specific number of display areas (or a specific number of display units) and a specific number of optical imaging modules and scattering screens may be used as needed to realize floating displays of different sizes. The modules can be spliced for instant use, which is especially advantageous to realizing large-sized floating displays; 3) Design for optical imaging modules is finished at one time. It is enough to use a corresponding number of the same optical imaging modules according to the required size of the floating images to seamlessly splice floating images, without the need to design different optical imaging modules for different sizes of floating images; 4) The thickness of the splicing display apparatus is small, achieving thinness and lightness; 5) The splicing display apparatus may be an aberration-free system, without the need to correct optical aberrations, and the optical structure is simple. It belongs to an optical field three-dimensional display technology to employ the splicing display apparatus to realize reconstruction of the optical field of the display modules in the air. The light beam on the display module(s) that is imaged through the optical imaging module along the x direction has a relatively large image-side aperture angle, which satisfies the binocular parallax condition, whereby floating display of the image can be realized.

It is to be understood that the above description is intended to be illustrative, and not restrictive. For example, the above-described embodiments (and/or aspects thereof) may be used in combination with each other. In addition, various modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled.

The invention claimed is:

1. A splicing display apparatus for floating image, comprising:
   a display module configured to emit, on a display plane thereof, display light constituting a target image;
   a plurality of optical imaging modules configured to receive the display light to form a floating image in the air; and
   a one-dimensional scattering screen to scatter light in a y-direction,
   wherein each of the plurality of optical imaging modules comprises:
      a first one-dimensional conjugate imaging element to converge light beams from points on the display plane onto the one-dimensional scattering screen in the y-direction; and
      a second one-dimensional conjugate imaging element to converge light beams from points on the display plane onto a floating image plane different from the plane where the one-dimensional scattering screen is located in the x-direction, wherein the x-direction and the y-direction are orthogonal to a main optical axis of the optical imaging modules respectively.

2. The splicing display apparatus according to claim 1, wherein:
   the first one-dimensional conjugate imaging element is disposed between the display plane and the second one-dimensional conjugate imaging element along the main optical axis;
   the first one-dimensional conjugate imaging element and the second one-dimensional conjugate imaging element are disposed in parallel with each other;
   microstructural units of the first one-dimensional conjugate imaging element and microstructural units of the second one-dimensional conjugate imaging element are disposed orthogonally; and/or
   the display plane of the display module and the one-dimensional scattering screen are disposed in parallel with each other.

3. The splicing display apparatus according to claim 1, wherein the optical path length from the display plane to the first one-dimensional conjugate imaging element is a, and the optical path length from the display plane to the second one-dimensional conjugate imaging element is b, where $b \leq 2a$.

4. The splicing display apparatus according to claim 1, wherein the display module is composed of a plurality of display units spliced together or the display module has a plurality of independent display areas.

5. The splicing display apparatus of claim 1, wherein the image height of the plurality of optical imaging modules in the x-direction is equal to the object height in the x-direction.

6. The splicing display apparatus according to claim 1, wherein the target image displayed on the display plane and a floating image presented on the floating image plane are in an upright imaging relationship.

7. The splicing display apparatus of claim 1, wherein the plurality of optical imaging modules have the same structure.

8. The splicing display apparatus according to claim 1, wherein the optical path between the one-dimensional scattering screen and the first one-dimensional conjugate imaging element is substantially equal to the optical path between the display plane and the first one-dimensional conjugate imaging element.

9. The splicing display apparatus of claim 1, wherein the display plane and the floating image plane are disposed in substantial symmetry with respect to the second one-dimensional conjugate imaging element.

10. The splicing display apparatus according to claim 1, wherein at least one optical imaging module of the plurality of optical imaging modules has a one-dimensional aperture stop for limiting the height of light rays passing through the at least one optical imaging module in the y-direction without limiting light rays in the x-direction.

11. The splicing display apparatus of claim 1, wherein at least one optical imaging module of the plurality of optical imaging modules further comprises a beam splitting plate, wherein the first one-dimensional conjugate imaging element and the second one-dimensional conjugate imaging element are retroreflective screens, wherein the display light gets reflected by the beam splitting plate and then enters the first one-dimensional conjugate imaging element, gets reflected by the first one-dimensional conjugate imaging element and then gets transmitted by the beam splitting plate and enters the second one-dimensional conjugate imaging element, gets reflected by the second one-dimensional conjugate imaging element and then gets reflected by the beam splitting plate, forming the floating image on the floating image plane.

12. The splicing display apparatus according to claim 1, wherein the spacing between the first one-dimensional conjugate imaging element and the second one-dimensional conjugate imaging element is less than 200 mm.

13. The splicing display apparatus according to claim 11, wherein the beam splitting plate is disposed obliquely between the first one-dimensional conjugate imaging element and the second one-dimensional conjugate imaging element and between the display plane and the floating image plane, the beam splitting plate is a polarizing beam splitting plate, and the at least one optical imaging module further comprises:
 a first phase delay plate disposed between the first one-dimensional conjugate imaging element and the beam splitting plate; and
 a second phase delay plate disposed between the second one-dimensional conjugate imaging element and the beam splitting plate.

14. The splicing display apparatus according to claim 13, wherein at least one of the first and second phase delay plates are half-wave plates, and the angle between the direction of the optical axis of the half-wave plates and the direction in which a microstructural unit of the retroreflective screen extends is 22.5° or 67.5°.

15. The splicing display apparatus according to claim 1, wherein at least one optical imaging module of the plurality of optical imaging modules further comprises a filter element for passing through light rays with a predetermined range of angles.

16. The splicing display apparatus according to claim 1, wherein the splicing display apparatus further comprises at least one ray deflection unit disposed between the plurality of optical imaging modules and the one-dimensional scattering screen along the main optical axis.

17. The splicing display apparatus according to claim 1, wherein the splicing display apparatus further comprises an array of lens disposed between the one-dimensional scattering screen and the floating image plane along the main optical axis.

18. The splicing display apparatus according to claim 1, wherein the display module is a three-dimensional display.

19. A multi-layer display device comprising:
 a splicing display apparatus of claim 1; and
 a transparent display apparatus disposed optically downstream of the splicing display apparatus, wherein a display plane of the transparent display apparatus is located at a position different from a position of the floating image plane.

20. The multi-layer display device of claim 19, wherein the transparent display apparatus comprises a transparent display or is implemented by projecting an image onto a transparent/translucent film.

* * * * *